United States Patent
Schacht et al.

(10) Patent No.: US 12,134,900 B2
(45) Date of Patent: Nov. 5, 2024

(54) FLOOR PANEL AND METHOD FOR MANUFACTURING THE SAME

(71) Applicant: FLOORING INDUSTRIES LIMITED, SARL, Bertrange (LU)

(72) Inventors: Benny Schacht, Wielsbeke (BE); Jan De Rick, Geraardsbergen (BE)

(73) Assignee: UNILIN BV, Wielsbeke (BE)

(*) Notice: Subject to any disclaimer, the term of this patent is extended or adjusted under 35 U.S.C. 154(b) by 388 days.

(21) Appl. No.: 17/427,770

(22) PCT Filed: Feb. 4, 2020

(86) PCT No.: PCT/IB2020/050860
§ 371 (c)(1),
(2) Date: Aug. 2, 2021

(87) PCT Pub. No.: WO2020/161609
PCT Pub. Date: Aug. 13, 2020

(65) Prior Publication Data
US 2022/0120096 A1    Apr. 21, 2022

(30) Foreign Application Priority Data
Feb. 4, 2019   (BE) .................................. 2019/5064

(51) Int. Cl.
*E04F 15/10*   (2006.01)
*B32B 3/06*    (2006.01)
(Continued)

(52) U.S. Cl.
CPC ............. *E04F 15/107* (2013.01); *B32B 3/06* (2013.01); *B32B 5/18* (2013.01); *B32B 27/065* (2013.01);
(Continued)

(58) Field of Classification Search
CPC .. E04F 15/107; E04F 15/02038; E04F 15/105
(Continued)

(56) References Cited

U.S. PATENT DOCUMENTS 2,111,113 A  *  3/1938  Fischer ................. E04F 15/105
                                              404/66
3,988,187 A  *  10/1976 Witt ......................... E04F 15/22
                                              52/204.593
(Continued)

FOREIGN PATENT DOCUMENTS

BE    1020739 A3    4/2014
BE    1024356 A1    1/2018
(Continued)

OTHER PUBLICATIONS

International Search Report and Written Opinion from PCT Application No. PCT/IB2020/050860, Mar. 23, 2020.
(Continued)

*Primary Examiner* — Brian D Mattei
*Assistant Examiner* — Joseph J. Sadlon
(74) *Attorney, Agent, or Firm* — Workman Nydegger

(57) ABSTRACT

A floor panel includes a core and decorative layer applied thereon, such that the material of the aforementioned core has a density of more than 1000 kg/m³, preferably more than 1300 kg/m³, and has a thickness of 6 millimeters or more. The core has internal spaces and/or that the core has spaces on its bottom side. A method for manufacturing such floor panels is provided according to the aforementioned floor panel.

12 Claims, 6 Drawing Sheets

(51) Int. Cl.
  *B32B 5/18* (2006.01)
  *B32B 27/06* (2006.01)
  *B32B 27/20* (2006.01)
  *B32B 27/22* (2006.01)
  *B32B 27/30* (2006.01)
  *B32B 27/32* (2006.01)
  *E04F 15/02* (2006.01)

(52) U.S. Cl.
  CPC ............. *B32B 27/20* (2013.01); *B32B 27/22* (2013.01); *B32B 27/304* (2013.01); *B32B 27/32* (2013.01); *E04F 15/02038* (2013.01); *E04F 15/105* (2013.01); *B32B 2264/10* (2013.01); *B32B 2307/72* (2013.01); *B32B 2307/732* (2013.01); *B32B 2419/04* (2013.01)

(58) Field of Classification Search
  USPC ........................................................ 52/588.1
  See application file for complete search history.

(56) References Cited

U.S. PATENT DOCUMENTS

| | | | |
|---|---|---|---|
| 4,084,996 A * | 4/1978 | Wheeler | B32B 3/30 144/368 |
| 4,180,615 A * | 12/1979 | Bettoli | E04F 15/10 427/520 |
| 4,581,255 A * | 4/1986 | Coggan | E04C 2/30 427/325 |
| 4,612,074 A * | 9/1986 | Smith | B29D 99/0057 156/240 |
| 4,614,680 A * | 9/1986 | Fry | B32B 38/06 428/141 |
| 4,731,139 A * | 3/1988 | Feyerabend | B29C 59/00 156/154 |
| 4,945,697 A | 8/1990 | Ott et al. | |
| 5,103,614 A * | 4/1992 | Kawaguchi | E04F 15/181 52/392 |
| 5,540,025 A * | 7/1996 | Takehara | B32B 7/02 52/592.1 |
| 5,900,099 A * | 5/1999 | Sweet | B32B 7/06 156/289 |
| 6,247,285 B1 * | 6/2001 | Moebus | E04F 15/04 52/480 |
| 6,306,318 B1 * | 10/2001 | Ricciardelli | B29C 45/0005 264/37.32 |
| 6,764,741 B2 * | 7/2004 | Kawasumi | B32B 5/26 428/110 |
| 7,386,963 B2 * | 6/2008 | Pervan | E04F 15/02 52/592.1 |
| 7,811,489 B2 * | 10/2010 | Pervan | B32B 3/06 264/913 |
| 8,544,232 B2 | 10/2013 | Wybo et al. | |
| 8,591,677 B2 * | 11/2013 | Kipp | C04B 24/2623 156/39 |
| 8,617,439 B2 * | 12/2013 | Pervan | B27N 3/02 428/297.4 |
| 8,650,823 B2 * | 2/2014 | Amend | B29C 44/16 52/309.4 |
| 8,702,881 B2 * | 4/2014 | Yu | B32B 9/005 428/312.4 |
| 8,828,175 B2 * | 9/2014 | Roy | B32B 38/10 156/268 |
| 9,038,341 B2 * | 5/2015 | Lam | E04F 15/02038 52/592.6 |
| 9,140,010 B2 * | 9/2015 | Pervan | E04F 15/102 |
| 9,273,472 B2 * | 3/2016 | Döhring et al. | B32B 27/42 |
| 9,446,568 B2 * | 9/2016 | Larson | E04D 5/10 |
| 9,482,004 B2 * | 11/2016 | Braun | B32B 21/00 |
| 9,545,771 B2 * | 1/2017 | Sosnowski | B32B 7/12 |
| 9,631,361 B2 * | 4/2017 | Clausi | B32B 21/02 |
| 9,636,889 B2 * | 5/2017 | Pawlak | B32B 27/30 |
| 9,695,590 B2 * | 7/2017 | Amend | E04C 2/26 |
| 9,845,596 B2 * | 12/2017 | Frantz | E04B 9/0457 |
| 9,951,519 B2 * | 4/2018 | Neil | E04B 1/66 |
| 10,233,656 B2 * | 3/2019 | Courey | B32B 27/304 |
| 10,265,929 B2 * | 4/2019 | Lee | E04F 15/20 |
| 10,378,220 B2 * | 8/2019 | Paul | E04F 15/022 |
| 10,626,621 B2 * | 4/2020 | Polk, Jr. | F16B 5/0088 |
| 10,661,548 B2 * | 5/2020 | Klackmann-Schneider | B41M 5/0064 |
| 10,677,275 B1 * | 6/2020 | Caselli | F16B 5/0016 |
| 10,760,283 B2 * | 9/2020 | Carrubba | E04F 15/02033 |
| 10,988,939 B2 | 4/2021 | Van Vlassenrode et al. | |
| 11,198,976 B2 * | 12/2021 | Leys | E04F 15/02038 |
| 11,541,641 B2 * | 1/2023 | Chen | B32B 27/306 |
| 11,873,387 B2 * | 1/2024 | Brunner | B29C 48/022 |
| 2006/0154015 A1 * | 7/2006 | Miller | B32B 9/042 428/50 |
| 2007/0256379 A1 * | 11/2007 | Edwards | B32B 5/145 52/309.9 |
| 2008/0138560 A1 | 6/2008 | Windmoller | |
| 2008/0241440 A1 | 10/2008 | Bauer | |
| 2008/0257222 A1 * | 10/2008 | Wallner | C04B 28/04 106/689 |
| 2009/0226662 A1 * | 9/2009 | Dyczko-Riglin | E04F 15/10 428/95 |
| 2014/0050895 A1 | 2/2014 | Hsueh | |
| 2015/0064390 A1 * | 3/2015 | Gustafsson | E04C 2/246 428/192 |
| 2015/0343739 A1 * | 12/2015 | Pervan | E04F 15/107 428/512 |
| 2015/0345154 A1 * | 12/2015 | Permesang | E04F 15/10 428/423.1 |
| 2016/0281367 A1 * | 9/2016 | Jiang | E04F 15/107 |
| 2017/0106670 A1 | 4/2017 | Clement et al. | |
| 2017/0306637 A1 | 10/2017 | Wagner | |
| 2017/0335573 A1 | 11/2017 | Segaert et al. | |
| 2018/0038115 A1 | 2/2018 | Cappelle | |
| 2018/0123484 A1 * | 5/2018 | Peace | H02N 2/18 |
| 2018/0163410 A1 * | 6/2018 | Peace | G01N 27/048 |
| 2019/0292793 A1 | 9/2019 | Van Vlassenrode et al. | |
| 2020/0048915 A1 | 2/2020 | Van Vlassenrode et al. | |
| 2022/0136529 A1 | 5/2022 | Seo et al. | |
| 2023/0083180 A1 | 3/2023 | Miyashita et al. | |

FOREIGN PATENT DOCUMENTS

| | | | | |
|---|---|---|---|---|
| BE | 1024734 A1 | 6/2018 | | |
| EP | 1026341 A2 | 8/2000 | | |
| EP | 1038689 A1 | 9/2000 | | |
| EP | 1875011 A1 | 1/2008 | | |
| EP | 1902834 A1 | 3/2008 | | |
| EP | 1970216 A2 * | 9/2008 | ............. | B32B 21/06 |
| EP | 2883712 A1 | 6/2015 | | |
| EP | 3456900 A1 | 3/2019 | | |
| FR | 1293043 A * | 5/1962 | ............. | E04F 15/10 |
| JP | H0656310 U * | 8/1994 | | |
| JP | H07180333 A | 7/1995 | | |
| KR | 101152155 B1 | 6/2012 | | |
| WO | 9747834 A1 | 12/1997 | | |
| WO | 0144669 A2 | 6/2001 | | |
| WO | 0175247 A1 | 10/2001 | | |
| WO | 2009080612 A1 | 7/2009 | | |
| WO | 2010072357 A2 | 7/2010 | | |
| WO | 2011141849 A2 | 11/2011 | | |
| WO | 2013179261 A1 | 12/2013 | | |
| WO | 2015105456 A1 | 7/2015 | | |
| WO | 2016151435 A1 | 9/2016 | | |
| WO | 2016182896 A1 | 11/2016 | | |
| WO | 2017001976 A1 | 1/2017 | | |
| WO | 2017087725 A1 | 5/2017 | | |
| WO | 2017122149 A1 | 7/2017 | | |
| WO | 2018087637 A1 | 5/2018 | | |
| WO | 2018087638 A1 | 5/2018 | | |
| WO | 2021018918 A1 | 2/2021 | | |

(56) References Cited

FOREIGN PATENT DOCUMENTS

| WO | 2021161609 A1 | 8/2021 |
| WO | 2023126444 A1 | 7/2023 |

OTHER PUBLICATIONS

Belgian Search Report from corresponding BE Application No. BE201905064, May 28, 2019.

* cited by examiner

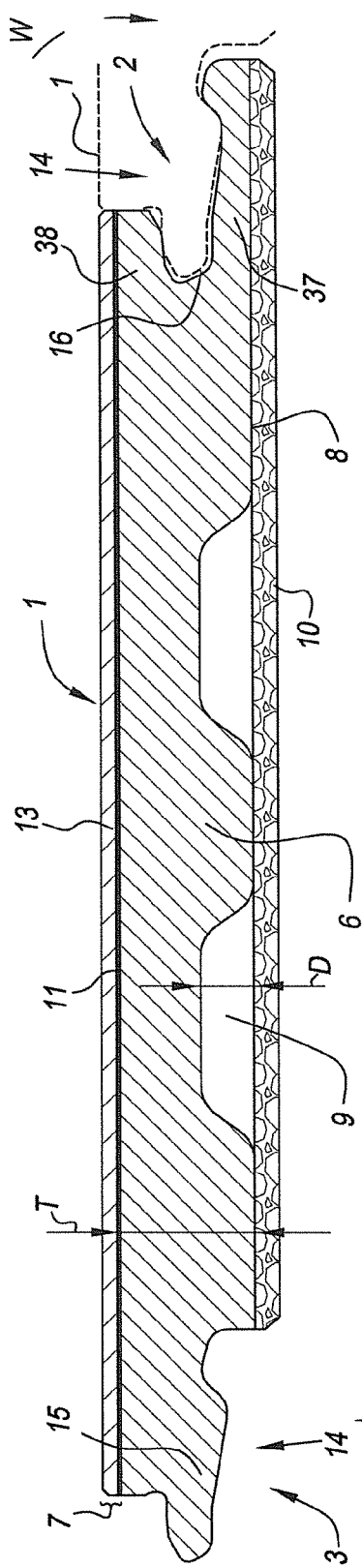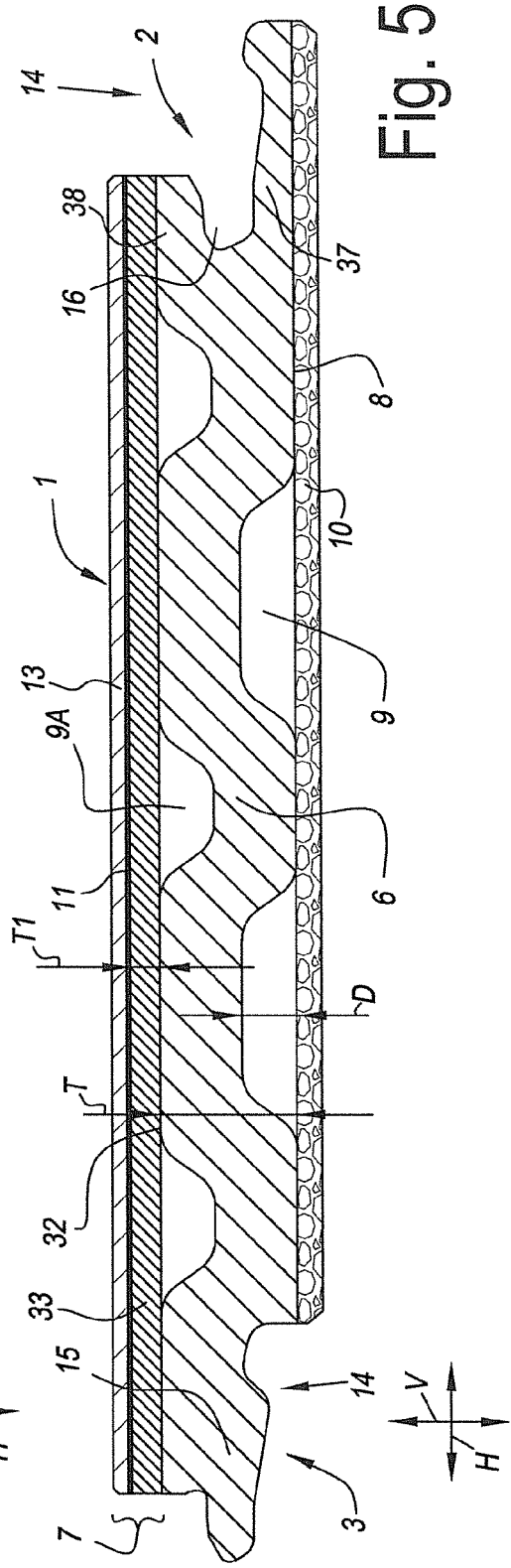

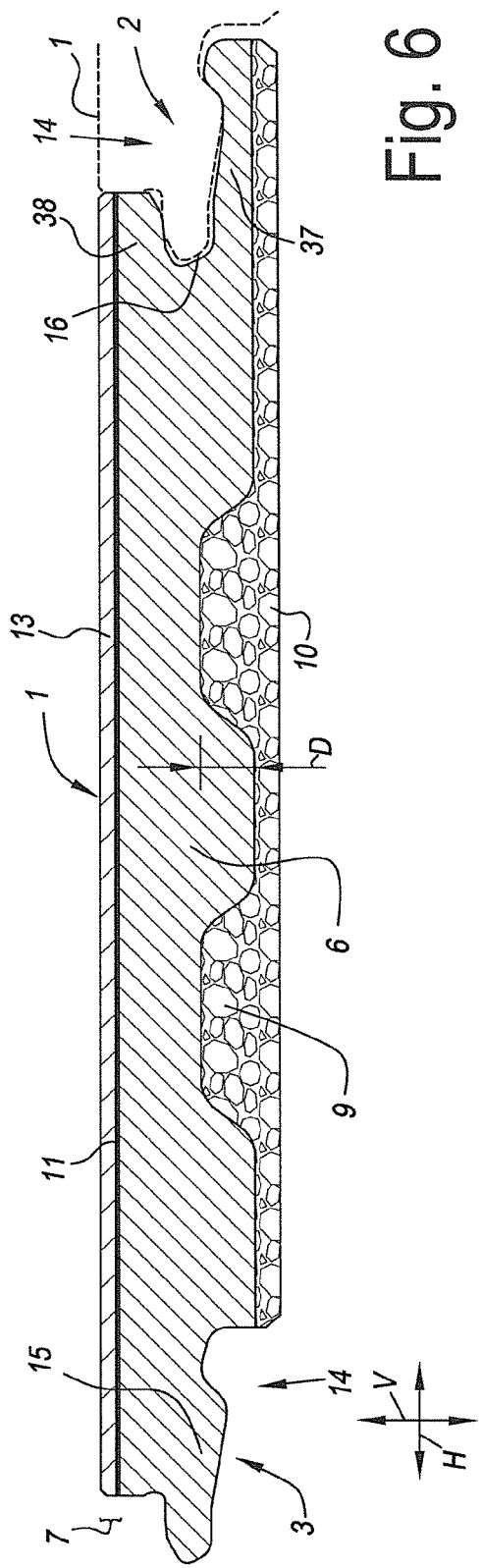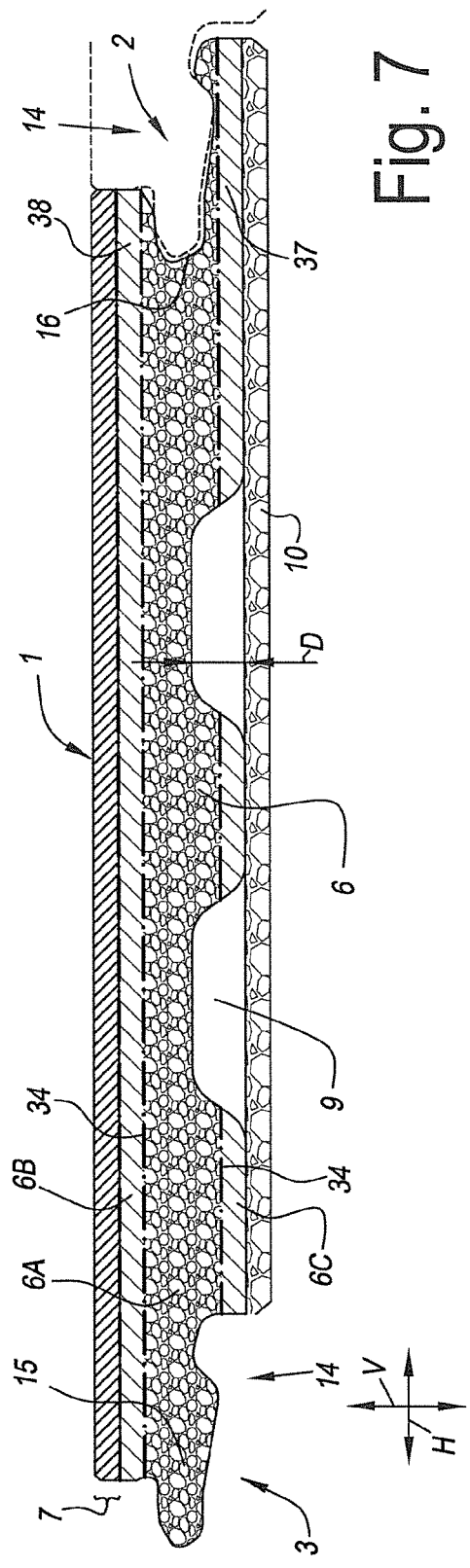

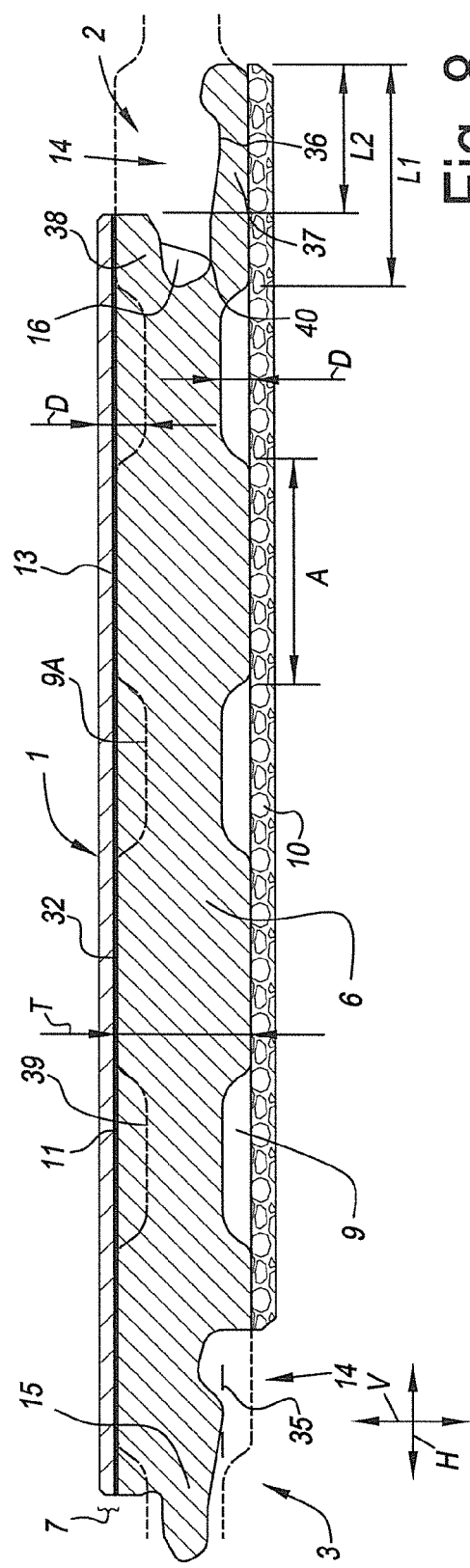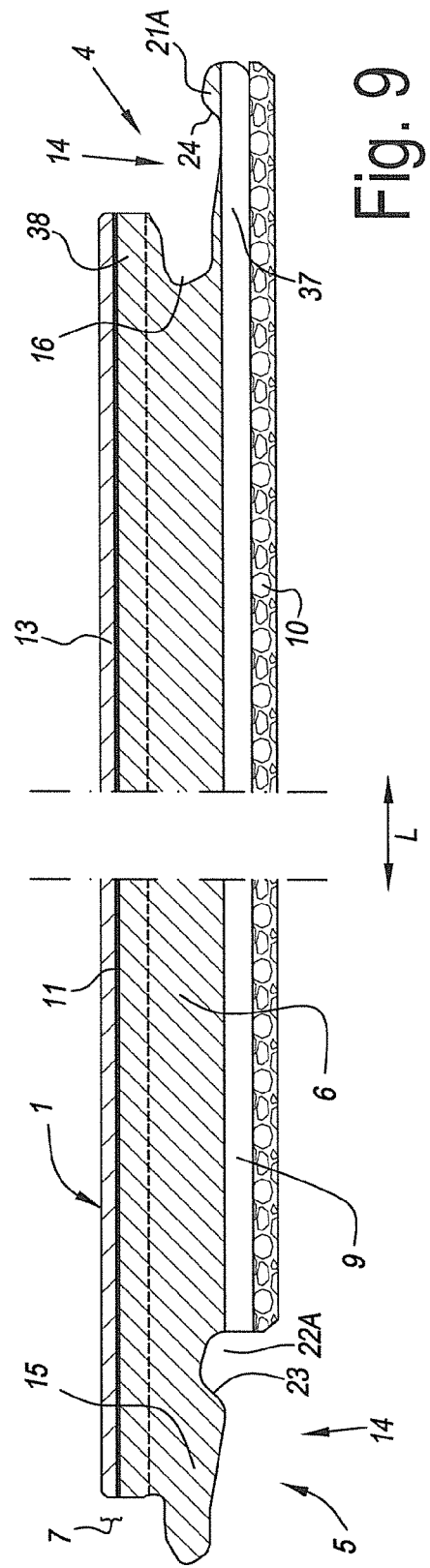

FLOOR PANEL AND METHOD FOR MANUFACTURING THE SAME

BACKGROUND

The present invention relates to floor panels and a method for manufacturing floor panels.

In particular, the invention relates to floor panels comprising a core and a decorative top layer applied thereon. Such floor panels are well-known now and form an alternative for natural floor products, such as solid parquet flooring and natural stone. The decorative top layer may have been printed with a pattern of wood or stone, or may comprise a layer of wood or stone. Examples of such floor panels are known, for example, from WO 97/47834, EP 1 038 689, EP 1 875 011, WO 2017/087725, WO 2011/141849, WO 2018/087637 and WO 2018/087638.

Laminate panels, as known from WO 97/47834, contain a core of MDF or HDF (Medium or High Density Fiberboard). Such core material cannot cope with prolonged exposure to moisture. Ceramic tiles, such as those known from EP 1 038 689, do not have this drawback, but require specialist knowledge for their installation. In order to remedy this, EP 1 875 011 and WO 2017/087725 propose floor panels comprising a mineral-based core and floor panels comprising a filled thermoplastic core, respectively. The core material of these floor panels is waterproof and is provided with mechanical coupling parts in order to make a smooth floating installation possible. The core material has a limited thickness, usually 5 millimeters or less, and is produced with a high density. The high density, usually more than 1000 kg/m$^3$, contributes to the stability of the floor covering. However, a packaging unit containing 5 panels or more may result in ergonomic problems during handling. Likewise, transportation via the road or in containers is not optimal. The limited thickness of these floor panels renders them suitable for renovation, but creates an impression of cheapness and unreliability.

WO 2011/141849 proposes the use of a foamed core material. In order to keep the resistance to compression at a high level, additional measures are desirable with this type of floor panels. These measures do, however, increase the weight of the floor panel.

SUMMARY

The prime object of the present invention is to provide an alternative floor panel, with various preferred embodiments offering a solution for the problems associated with the prior-art floor panels.

To this end, the invention, according to its first independent aspect, relates to a floor panel comprising a core and a decorative layer which is applied thereon, wherein the material of the aforementioned core has a density of more than 1000 kg/m$^3$, preferably more than 1300 kg/m$^3$ or even more than 1800 kg/m$^3$, and/or wherein the core material has a thickness of 6 millimeters or more, characterized by the fact that the core has internal spaces and/or that the core has spaces on its bottom side. According to the invention, a floor panel is thus obtained which combines various properties. Due to its thickness and/or weight, the floor panel gives the impression of being a premium product. The preferred density of the core material may result in increased stability and resistance to compression. The spaces which are present may increase the ergonomics during use and reduce the problems during transportation.

Preferably, the core material has a thickness of 8 millimeters or more, for example between 8 and 13 millimeters.

Paper-based top layers may be used for the decorative top layer, such as DPL or HPL top layers (Direct Pressure Laminate, High Pressure Laminate). One or several such paper layers are preferably provided with a cured plastic, such as cured melamine resin or cured polyurethane. Preferably, such a top layer comprises at least one printed paper sheet which forms the decoration by, for example, showing the pattern of wood or stone. Preferably, at least a plastic layer is situated on top of this pattern. According to another possibility, the decorative top layer is substantially composed of a thermoplastic material, such as polyvinylchloride, polyethylene terephthalate, polypropylene or polyethylene. Preferably, such a top layer comprises at least one printed thermoplastic film which forms the decoration by, for example, showing the pattern of wood or stone. Preferably, at least a thermoplastic plastic layer is situated on top of this pattern. Preferably, a backing layer which is also made of thermoplastic plastic is situated between the printed film and the core. According to yet another possibility, the decorative top layer comprises a layer of wood, either a wood veneer, for example having a thickness of less than 1 millimeter, or a wooden top layer, for example having a thickness of 2.5 millimeters or more. Preferably, the surface of the respective layer of wood is oiled or varnished. According to yet another possibility, the decorative top layer comprises a print which is formed directly on the core, preferably by means of one or several preparatory base layers, which forms the decoration by showing, for example, the pattern of wood or stone. Preferably, at least a transparent plastic layer is situated on top of this pattern.

Preferably, one or more or all of the aforementioned spaces are free from solid material or in other words are filled with air, for example in the form of optionally closed air chambers. According to an alternative, one or more or all of the aforementioned spaces are filled with a material having a density of less than 500 kg/m$^3$, or even of 300 kg/m$^3$ or less. The respective spaces may be filled, for example, with a plastic foam or a mineral foam, such as vermiculite, perlite or pumice.

Preferably, the material of the core is waterproof, for example to such a degree that when immersed in water for 24 hours, a thickness swelling of less than 3% occurs.

According to respective embodiments, the core may comprise different materials.

According to a first possibility for this, the material of the aforementioned core is substantially mineral-based, for example based on lime cement, magnesium cement or plaster. In the case of lime cement or Portland cement, the core is preferably substantially in the form of a fiber cement board, for example of the type which is produced using the so-called Hatschek process, described inter alia in GB 6455 in 1900. In the case of magnesium cement, the core is preferably substantially in the form of a so-called magnesium oxide board, as described in KR 10-1152155 B1, namely by hardening a slurry of magnesium oxide (50 to 70% by weight) and magnesium chloride (15 to 35% by weight), optionally with a filler (0 to 15% by weight), such as wood particles. Preferably, such a magnesium oxide board has a glass-fiber layer on one or both surfaces, preferably of the woven type. In the case of plaster, the core is preferably substantially in the form of a plaster fiber board, wherein the respective fibers may be made of cellulose and/or glass fiber. Preferably, such plaster fiber board is produced by means of the hydraulic hardening reaction of a fiber-containing plaster slurry. Such a plaster fiber board may be provided with a reinforcement on one or both surfaces, such as a cardboard layer and/or a glass-fiber layer, preferably of the non-woven type.

According to a second possibility, the material of the aforementioned core is substantially based on a plastic composite, wherein the aforementioned plastic composite is preferably a thermoplastic material, or is polyurethane, and comprises filler, wherein the filler preferably has a greater specific weight than the aforementioned thermoplastic material. Heavy fillers have a positive effect on the dimensional stability of the floor panel. Lime, limestone or talcum may be used, for example, as fillers. Other mineral fillers or organic fillers such as wood, straw or bamboo particles are not excluded. Preferably, the filler content in the material of the core is at least 40% by weight. According to a particular embodiment, the filler is a mineral filler, such as lime, talcum or limestone, and the filler content in the material of the core is between 65 and 87% by weight.

According to a first important example of the above second possibility, the thermoplastic material is polyvinylchloride, preferably having a plasticizer content of 5 phr or less or even without plasticizer. As has been mentioned above, such a material may be filled with a mineral filler. Preferably, the filler content is between 40 and 87% by weight, better still between 65 and 87% by weight of the core material formed by the filler.

According to a second example of the second possibility, the thermoplastic material is polypropylene or polyethylene or polyethylene terephthalate, optionally mixed with an elastomer. Thus, for example, the material disclosed in WO 2017/122149 may be used. As has been mentioned above, such material may be filled with a mineral filler. Preferably, the filler content is between 40 and 87% by weight, better still between 65 and 87% by weight of the core material formed by the filler.

The material of the core may be uniform across its thickness, namely without noticeable differences in composition or density, viewed across the thickness of the material. In such a case, a core material is preferably used which is free from or is virtually free from inclusions of air, as is the case with an unfoamed thermoplastic core material. According to another embodiment, the core may have layers of different composition. Thus, for example, an internal layer of the core may be foamed, for example comprise closed-cell PVC foam, while one or both adjacent layers may be unfoamed or foamed to a lesser degree. Both with uniform core materials and with core materials having two or several layers of different composition, one or several reinforcing layers may be incorporated in the core or on the core. Such reinforcing layers may be, for example, glass-fiber layers of the woven or the unwoven type.

Preferably, the aforementioned spaces result in a weight reduction of the aforementioned core of at least 15%, also in those cases in which one or several of the spaces, according to the abovementioned alternative for air as a filler, are filled with a material having a density of less than 500 kg/m$^3$, or even of 300 kg/m$^3$ or less. Preferably, the aforementioned weight reduction is 20% or more. It will be clear that the aforementioned weight reduction may be calculated by comparing the weight of the core material of the floor panel to a core made of the same core material, having the same dimensions and with a thickness equal to the maximum thickness of the core material of the floor panel, but without the aforementioned spaces.

Preferably, a cork layer or a synthetic foam layer is provided on the bottom side of the core, preferably by gluing it to the bottom side. In the case of a synthetic foam layer, this is preferably physically crosslinked polyethylene, also known as IXPE. Chemically crosslinked polyethylene, also known as XLPE, is not excluded. Foams based on a different polyolefine or on polyvinylchloride or polyurethane are also possible. Preferably, such a synthetic foam layer is not, or hardly, filled with fillers, or such a synthetic foam layer has a degree of filling of less than 15% by weight.

The possible cork layer or synthetic foam layer has different functions. On the one hand, it can contribute to prevent or muffle impact noise in the respective space where the floor covering is installed and/or in spaces situated underneath, and on the other hand, it renders spaces formed on the bottom side of the core invisible to the eye.

Preferably, the aforementioned spaces extend continuously from one side of the floor panel to another side of the floor panel. Such continuous spaces on the one hand ensure a maximum weight reduction, but on the other hand also have the advantage that they allow for some ventilation under the floor covering, namely at least at the location of the respective sides, and optionally, if the spaces are situated on the bottom side of the core and no cork or foam layer is used, also at the actual bottom side of the floor panel. In this way, moisture which accumulates under the floor covering, for example due to the fact that it has penetrated unexpectedly into the seams between the floor panels, may evaporate more easily and be carried away with the air flow.

Preferably, the floor panel is rectangular and the aforementioned spaces extend in the length direction of the floor panel. In this way, the spaces only have a limited effect on the bending rigidity in the length direction of the floor panel. This rigidity is of particular importance for ease of installation of the floor panel.

It will be clear that the depth of the spaces is preferably constant or virtually constant along the entire length of such a space. Preferably, any variation in the depth of the space is less than 25% with respect to a mean depth. In other words, at a mean value D, the depth may vary between 0.75 D and 1.25 D.

Preferably, the aforementioned spaces have a mean depth which is less than half the thickness of the core material, and is preferably between 15 and 40% of the thickness of the core material. As mentioned above, the depth is preferably constant over the length of such a space.

Preferably, on at least two opposite sides, the floor panel is provided with mechanical coupling means which make it possible for two such floor panels to be coupled to each other at the respective sides, an interlocking being produced in the coupled state, at least in a direction at right angles to the respective sides and in the plane of the floor panels. Preferably, in the coupled state, an interlocking is also produced in a direction at right angles to the plane of the floor panels on the respective sides. Preferably, the coupling means still have one or a combination of two or more of the following properties:

the property that the mechanical coupling means or coupling parts are substantially in the form of a tongue and a groove delimited by an upper lip and a lower lip, wherein this tongue and groove are substantially responsible for the interlocking in the aforementioned vertical direction, and wherein the tongue and the groove are provided with secondary locking parts, substantially responsible for interlocking in the aforementioned horizontal direction. Preferably, the locking parts comprise a locking groove on the bottom side of the edge with the tongue and a hook-shaped portion being provided on the bottom groove lip. Such coupling means and locking parts are known, for example, from WO 97/47834;

the property that the mechanical coupling means or coupling parts push the coupled floor panels against each other, for example because these mechanical coupling means are produced with so-called pretension, as is known per se from EP 1 026 341. The tension at which the floor panels are pressed against each other or towards each other may, for example, in combination with the above property, be achieved by means of a lower lip which is bent outwards in the coupled position and which presses against the bottom side of the tongue when it tries to spring back;

the property that the mechanical coupling means allow a coupling towards each other by means of a horizontal, or nearly horizontal, sliding movement of the panels;

the property that the mechanical coupling means allow a coupling by means of a turning movement W along the respective edges;

the property that the mechanical coupling means allow a coupling by means of a downwardly directed movement of a male coupling part, for example having a tongue, into a female coupling part, for example having a groove;

the property that the mechanical coupling means, or at least the associated top edge, is produced by means of a milling operation using rotating milling tools.

Preferably, one or several of the aforementioned spaces extend at least into the aforementioned mechanical coupling means on one or both of the respective opposite sides. Preferably, the respective spaces in this case result in increased flexibility of the mechanical coupling means or the components thereof on one or both opposite sides. Thus, for example, one or several spaces may locally interrupt a bendable portion, for example a lip extending on the bottom side, such as a bottom groove lip, for example in such a way that, viewed along the respective side, the respective portion, for example a lip, is subdivided into two or more independently bendable portions. Subdividing a bendable portion, such as a lip, is attractive for all embodiments of mechanical coupling means which allow coupling by means of a horizontal, or nearly horizontal, sliding movement of the panels towards each other, by means of a turning movement W along the respective edges; and/or by means of a downwardly directed movement of a male coupling part, for example comprising a tongue, into a female coupling part.

According to a particular embodiment, the floor panel of the embodiment is rectangular, the aforementioned spaces run in the longitudinal direction of the panels, the floor panel is provided with coupling means on both the long pair and on the short pair of opposite sides. On the long pair of opposite edges, the floor panel is provided with mechanical coupling means which make a coupling by means of a turning movement W along the respective edges possible, wherein an interlocking is produced in the coupled state of two such long edges, both in a horizontal direction at right angles to the edges and in the plane of the floor panels, and in a vertical direction at right angles to the plane of the floor panels. The respective coupling means are substantially in the form of a tongue and a groove, with the groove being provided with a locking element on one of its lips flanking the groove, for example in the form of an upright portion on the bottom groove lip which can cooperate with a locking element on the tongue, for example in the form of a space in the bottom side of the tongue. In the coupled state, at least horizontally active locking surfaces is produced on the aforementioned locking elements. Preferably, vertically active locking surfaces are produced between the top side of the tongue and the bottom side of the upper groove lip. The floor panel may be provided with similar coupling means on the short pair of opposite edges. Preferably, on the short pair of edges, the floor panel is provided with coupling means which enable coupling by means of a downwardly directed movement of a male coupling part, for example comprising a tongue, into a female coupling part, for example comprising a groove and/or at least comprising a lip which projects beyond the associated top edge. Preferably, the female coupling part is provided with a lip which projects beyond the associated top edge and this lip is provided with a locking element in the form of an upright portion which can cooperate with a locking element on the bottom side of the male coupling part, for example in the form of a space in the bottom side of the male coupling part. In the coupled state, at least horizontally active locking surfaces are produced on the aforementioned locking elements. Preferably, vertically active locking surfaces are also produced in the coupled state. The vertically active locking surfaces may coincide with the aforementioned horizontal locking surfaces and/or comprise separate surfaces. Preferably, the depth of one or several or all spaces on the bottom side of the core material at the location of the respective short edge is such that at least a portion of the horizontally active surfaces on the locking element of the projecting lip is retained at the location of the space. Preferably, at least 50% of the height of the horizontally active contact surface is retained at the location of the space.

Using spaces with floor panels which are provided with coupling means on both pairs of edges, in particular aimed at retaining at least a portion of the horizontal locking surfaces at the location of the spaces, is important for any type of floor panel. It is therefore clear that, according to a particular independent aspect, the invention also relates to a floor panel, optionally in accordance with the first aspect and/or its preferred embodiments, wherein the aforementioned floor panel is rectangular, comprises a core material and is provided with coupling means on both the long pair and the short pair of opposite sides, wherein the coupling means on the short pair of edges comprise a male coupling part and a female coupling part which can cooperate with each other, wherein the female coupling part is provided with a lip which projects beyond the associated top edge and wherein this lip is provided with a locking element in the form of an upright portion which can cooperate with a locking element on the bottom side of the male coupling part, for example in the form of a space in the bottom side of the male coupling part, wherein, in the coupled state, at least horizontally active locking surfaces are produced on the aforementioned locking elements, characterized in that the floor panel has one or several spaces on its bottom side or on the bottom side of the core material, wherein these spaces preferably extend into the short edge comprising the female coupling part. Preferably, one or several of the aforementioned spaces extend into the short edge comprising the female coupling part and the respective space has such a depth at the location of the respective edge that at least a portion of the aforementioned horizontally active surfaces on the locking element is retained at the location of the respective space, preferably wherein at least 50% of the height of the horizontally active contact surface is retained at the location of the space.

With the same object as in the first aspect, according to an independent second aspect, the present invention also relates to a method for manufacturing floor panels, wherein the aforementioned floor panels at least comprise a core, and the method at least comprises the step of consolidating the material of the core, characterized by the fact that the material to be consolidated has internal spaces and/or that the material to be consolidated has spaces on its bottom side. Due to the fact that the spaces have already been provided in the material still to be consolidated, additional treatments of the core material are prevented. In this way, it is possible to achieve a balanced consolidated unit. Treatments performed on the consolidated unit increase the risk of residual stresses in the core material leading to deformations.

Preferably, the material to be consolidated comprises a scattered bed of granulates, powders, fibers or other particles and/or the material to be consolidated comprises an extruded material and/or the material to be consolidated comprises a slurry.

In the case where the material to be consolidated comprises a, preferably scattered, bed of granulates, powders, fibers or other particles and/or a slurry, the material to be consolidated is arranged on a mold, for example on a structured conveying element or conveyor belt. The mold may also be formed by elements which have been arranged on an otherwise overall flat surface. Thus, for example, strips or ropes may be carried along on a conveyor belt which then, as such, form the aforementioned structure. It will be clear that the structure of the aforementioned mold forms the negative of a relief which is to be formed on the bottom side of the core material and which, according to the invention, preferably comprises one or several spaces. A method in which a material to be consolidated comprises a scattered bed of granulates is known per se, for example, from WO 2013/179261. A method in which a material to be consolidated comprises a slurry is known, for example, from the abovementioned KR 10-1152155 B1.

In the case where the material to be consolidated comprises an extruded material, the material to be consolidated is preferably formed by extrusion using a T-die. In this case, the respective slit which is situated on the side forming the bottom side of the core may be comb-like. It will be clear that the comb shape in this case forms the negative of the spaces to be formed on the bottom side. According to another possibility, likewise in the case where the material to be consolidated comprises an extruded material, the material to be consolidated may be formed by extrusion using at least two dies. In this case, the die which forms the bottom side of the core can extrude an amount of material which varies transversely to the extrusion direction. The respective die may alternately be closed and open in accordance with the desired spaces, namely in such a way that the closed portions correspond to the spaces.

It will be clear that the method of the second aspect is preferably used for manufacturing floor panels which furthermore also have the features of the first aspect and/or the preferred embodiments thereof.

BRIEF DESCRIPTION OF THE DRAWINGS

In order to show the features of the invention in more detail, some preferred embodiments are described below by way of example and without being limited thereto, with reference to the accompanying drawings, in which:

FIG. 2 shows a cross section on an enlarged scale along the intersecting line II-II illustrated in FIG. 1;

FIGS. 5 to 8 show variants in a view similar to that of FIG. 2;

FIG. 9 shows a cross section of the floor panel from FIG. 8 in a view along the intersecting line III-III illustrated in FIG. 1;

DETAILED DESCRIPTION OF VARIOUS EMBODIMENTS

Figure 1:
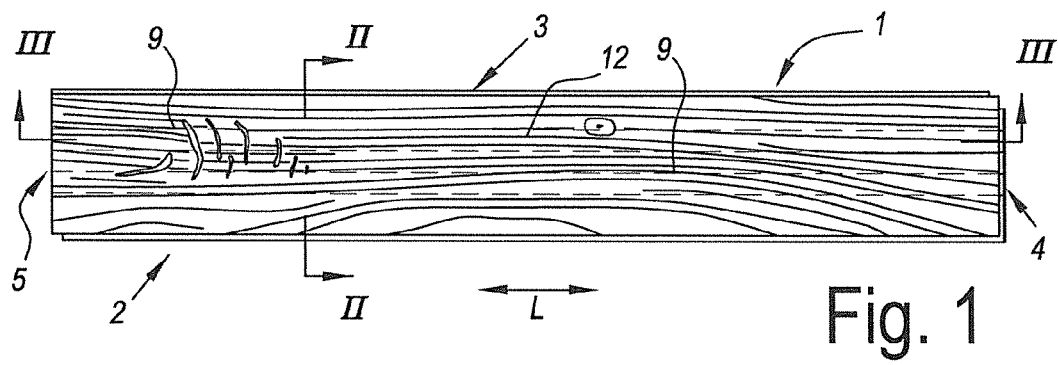
FIG. 1 shows a floor panel comprising the features of the invention.

FIG. 1 shows a floor panel 1 having the features of the invention. In this case, this involves a rectangular floor panel 1 having a pair of long opposite edges 2-3 and a pair of short opposite edges 4-5.

FIG. 2 shows that the floor panel 1 has a core 6 and a decorative layer 7 applied thereon. The core material has a thickness T of more than 6 millimeters, in those case even more than 10 millimeters, namely approximately 12 millimeters. The material of the core 6 has a density of more than 1000 kg per cubic meter, and in this case even of more than 1300 kg per cubic meter. The material of the core 6 involves, in particular, a plastic composite which comprises a thermoplastic material and filler. The thermoplastic material is polyvinylchloride (PVC) having a plasticizer content of less than 5 phr (5 parts per 100 parts of thermoplastic material or PVC). The content of fillers in the core is more than 40% by weight, in this case between 65 and 87% by weight, namely approximately 80% by weight.

FIG. 2 furthermore clearly shows that the core material 6 has spaces 9 on its bottom side 8. In this case, the aforementioned spaces 9 extend continuously from the one short edge 4 to the other short edge 5 of the floor panel 1, namely in the length direction L of the rectangular floor panel 1. A synthetic foam layer 10 is provided, for example made of physically or chemically crosslinked polyethylene, on the bottom side 8 of the core 6.

Here, the decorative layer 7 is substantially composed of thermoplastic material, more particularly from PVC, and comprises a printed thermoplastic film 11 which forms a decoration 12 comprising a pattern of wood. Above the aforementioned pattern 12, a transparent thermoplastic plastic layer 13, likewise made of PVC, is present.

The long edges 2-3 of the floor panel 1 are provided with mechanical coupling means 14 which allow two of such floor panels 1 to be coupled to each other by the respective edges 2-3. In the coupled state, a mutual interlocking between the respective edges 2-3 is produced, both in a horizontal direction H at right angles to the long edges 2-3 and in the plane of the floor panels 1, as in a vertical direction V at right angles to the plane of the floor panels 1. The coupling means 14 are substantially configured in the form of a tongue 15 and groove 16 and may be joined together at least by means of a turning movement W about the respective edges 2-3.

The depth D of the spaces 19 is constant, or at least still virtually constant along the entire length of the spaces 19, and is less than half the thickness T of the core material 6, and preferably between 15 and 40% of the thickness T of the core material 6.

Figure 3:
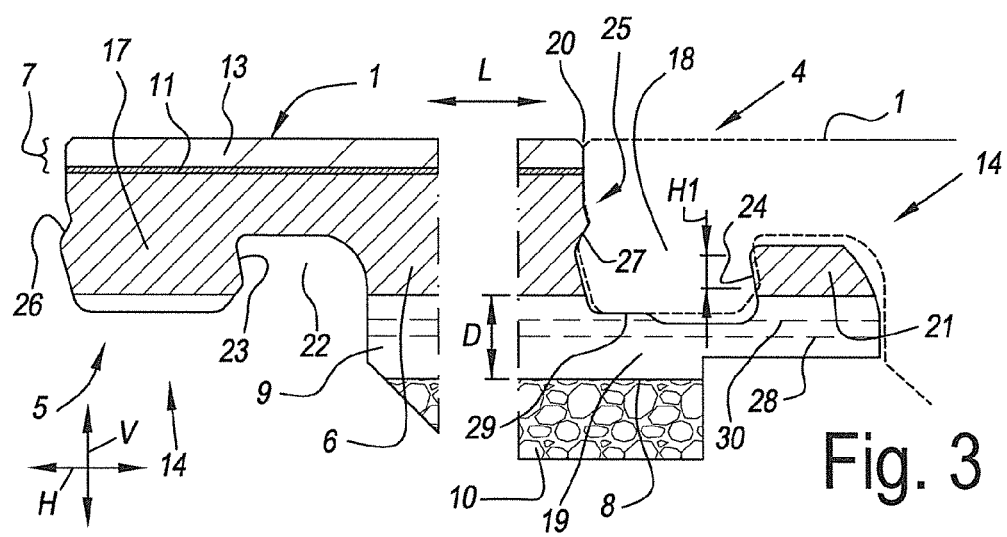
FIG. 3 shows a cross section on an even larger scale along the intersecting line III-III illustrated in FIG. 1.

FIG. 3 shows that the short sides 4-5 of the floor panel 1 are also provided with coupling means 14. The coupling means 14 on the short pair of edges 4-5 comprise a male coupling part 17 and a female coupling part 18 which can cooperate with each other. In the example, both the male coupling part 17 and the female coupling part 18 are made entirely from the material of the floor panel 1. The female coupling part 18 is provided with a lip 19 which projects beyond the associated top edge 20 and wherein this lip 19 is provided with a locking element in the form of an upright portion 21 which can cooperate with a locking element on the bottom side of the male coupling part 17, in the form of a space 22 in the bottom side of the male coupling part 17. In the coupled state, at least horizontally active locking surfaces 23-24 are produced on the aforementioned locking elements 21-22.

It will therefore be clear that the example also has the features of the particular independent aspect of the invention mentioned in the introduction.

FIG. 3 furthermore clearly shows that the aforementioned spaces 19 extend into the short edge 5 comprising the female coupling part 18. In the present case, the spaces 19 extend into the short edge 5 comprising the female coupling part 18, and into the short edge 4 comprising the male coupling part 17. At the location of the respective edge 4-5, the respective space 9 has a depth D which is such that at least a portion of the aforementioned horizontally active surfaces 23-24 is retained on the locking element at the location of the respective space 9, wherein at least 50% of the height H1 of the horizontally active contact surface 23-24 is retained at the location of the space 9, and in this case even 80% or more.

In the example from FIG. 3, the respective horizontally active contact surfaces 23-24, viewed from the bottom to the top, are inclined in the direction of the associated top edge 20. In this case, the deviation from the vertical is preferably 2 to 10°. As a result thereof, the same surfaces 23-24 also serve as vertically active contact surfaces. It will be clear that the above-described measure of the reduced depth D of the one or several spaces 19 also results in the advantage that at least the same portion of the height H1 of these vertically active surfaces is retained. In addition to these vertically active contact surfaces, the female coupling part 17 and the male coupling part 18, on a proximal wall 25 of the female coupling part 17, have further vertically active locking surfaces 26-27 which, in the example, are completely preserved since they are situated completely above the level of the space 9.

It should be noted that, in the context of the particular aspect mentioned in the introduction, it is also possible for the depth D of the space 9 to be such that it is entirely on a level under the upwardly directed groove of the female coupling part 17, and thus does not, or hardly, interfere with the satisfactory performance of the coupling means 14 on the short edges 4-5. This is illustrated by means of the dashed line 28. According to another possibility, the depth D of the space 9 is such that it is positioned under the lowest contact surface 29 between the male coupling part 17 and the female coupling part 18, without necessarily having to be on a level under the upwardly directed groove. This is illustrated by means of the dashed line 30.

Figure 4:
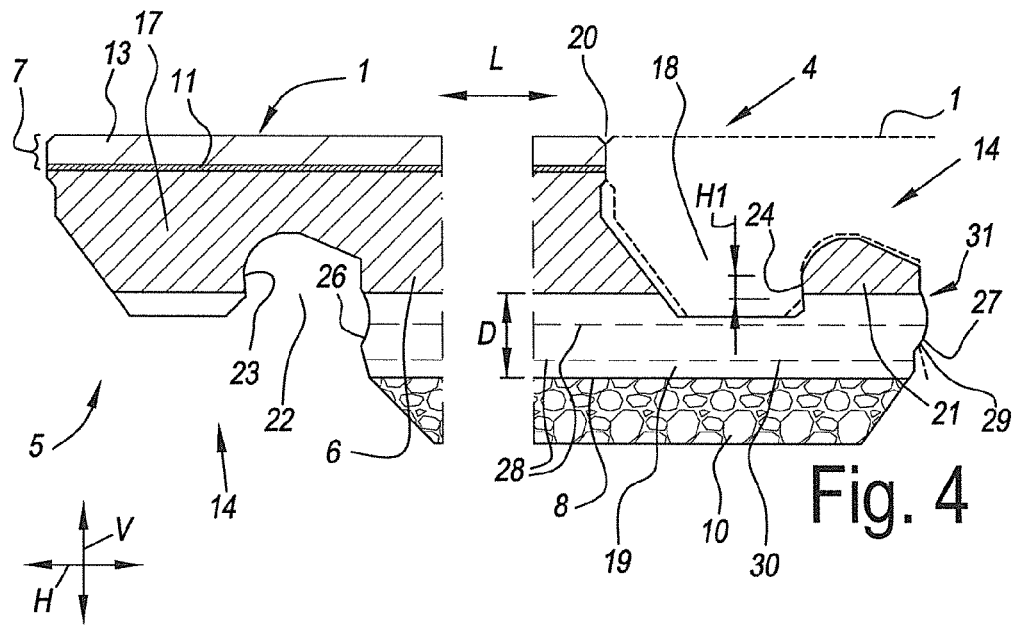
FIG. 4 shows a variant from the same view.

FIG. 4 shows a variant in which this coupling part 17, in addition to the vertically active contact surfaces formed on the projecting lip 19 of the female coupling part 17, has further vertically active locking surfaces 26-27 on a distal wall 31, namely on the distal wall of the aforementioned lip 19. In the illustrated case, the additional vertically active locking surfaces 26-27 at the location of the space 9 are not preserved, whereas at least 50% of the height H1 of the vertically active locking surfaces and the horizontally active locking surfaces 23-24 is preserved at the location of the upright portion 21 of the lip 19. It goes without saying that, also in this example, the level of the space 9 can be adjusted in accordance with the dashed lines 28-30, as defined by means of the description of FIG. 3.

FIG. 5 shows a variant in which the core material 6 is provided with spaces 9A on its top side 32 as well, similar to the spaces 9 formed on the bottom side 8 of the core material 6. In such a case, the decorative layer 7 preferably comprises a rigid layer 33, as is the case here, namely having a rigidity higher than the rigidity of the other portion of the decorative layer 7. In this case, this may be a layer which extends under a printed support or film 11, as is the case here. In the case of a decorative layer 7 composed of thermoplastic material, the aforementioned rigid layer 33 preferably likewise consists of thermoplastic material, but preferably, in the case of PVC, with a lower plasticizer content or without plasticizer, compared to the other portion of the decorative layer 7. The rigid layer 33 makes it possible for the spaces 9A on the top side 32 of the core 6 to be bridged more efficiently, namely with a reduced risk of collapse at the location of the spaces 9A.

It will be clear from the above that bridging spaces 9A on the top side 32 by means of the decoration layer 7 as such has inventive merits. According to a second particular independent aspect, the invention therefore also relates to a floor panel 1 comprising a core 6 and a decorative layer 7 applied thereon, wherein the material of the aforementioned core 6 has a density of more than 1000 kg/m$^3$, preferably more than 1300 kg/m$^3$, and/or wherein the aforementioned core has a thickness T of 6 millimeters or more, characterized by the fact that the core 6 has spaces 9A on its top side 32 and the decorative top layer 7 is chosen from the following:

- a decorative top layer 7 which contains a wood layer having a thickness of more than 1 millimeter, for example 2.5 millimeters or more;
- a decorative top layer 7 which comprises a stone, a ceramic or a mineral-based layer having a thickness of more than 1 millimeter, for example 3 millimeters or more;
- a decorative top layer which comprises a plastic layer having a thickness T1 of 1 millimeter or more; the plastic layer may, for example, be PVC with a plasticizer content of less than 1 phr; in such a case, the plastic layer preferably also has a decoration 12, for example applied as a printed thermoplastic film 11 and a transparent wear layer 13, preferably also thermoplastic. FIG. 5 gives an example thereof, with the aforementioned plastic layer being formed by the abovementioned rigid layer 33.

FIG. 6 gives an example which substantially corresponds to the example from FIGS. 1 to 3, but with the spaces 9 being filled with a material which has a density of less than 500 kg/m$^3$. In this case, this involves the same material as the aforementioned synthetic foam layer 10.

FIG. 7 shows an embodiment which substantially corresponds to the example from FIGS. 1 to 3, but wherein the core material 6 as such is composed from several layers 6A-6B-6C, namely comprising a central foamed PVC layer 6A, flanked above and below by a non-foamed or less foamed PVC layer 6B-6C. In the example, the layers are separated by glass-fiber layers 34, preferably of the non-woven type. The spaces 9 extend into the foamed PVC layer 6A.

FIGS. 8 and 9 show an embodiment which corresponds substantially to the example of FIGS. 1 to 3. However, FIGS. 8 and 9 show some particular features which may each be used separately or in combination in other embodiments.

A first particular feature consists in the fact that the depth D of the spaces 9 is such that they remain completely below the level 35 of the bottom side of the tongue 15 or coincide or virtually coincide therewith. Preferably also, as is the case here, the depth of the spaces 9 is such that they remain completely below the level 36 of the top side of bottom groove lip 37 or coincide or virtually coincide therewith.

A second particular feature consists in the fact that the distance A between two spaces 9 at the location of the bottom groove lip 37 is at least 80% of the length L1 of the aforementioned bottom groove lip 37, and/or at least 130% of the length L2 of the portion of the bottom groove lip 37 which projects beyond the upper groove lip 38 in horizontal direction H. Preferably, the distance A between every two adjacent spaces is as large as or virtually as large as, namely in each case at least 80% of the length L1 of the bottom groove lip 37 and/or at least 130% of the length L2 the projecting portion of the bottom groove lip 37.

By using a combination of the first and second features, it is possible to select the position of tongue 15 and groove 16 independently from the core material.

Preferably, a core material 6 is manufactured, for example in the way of the second independent aspect, having spaces 9 which comply with the first and/or the second particular feature. Such core material 6 may therefore be used for producing a floor panel 1 comprising coupling means 14. The production and action of the coupling means 14 will not, or hardly, be disrupted by using the first and/or the second particular feature.

A third particular feature, here illustrated by dashed line 39, consists in the fact that spaces 9A are formed at the top surface 32 of the core material 6. These may be present separately or may be present in combination with the spaces 9 on the bottom side 8 of the core 6. In the latter case, the spaces 9A at the top surface 33 are preferably, as is illustrated here by the dashed line 39, situated directly opposite the spaces 9 on the bottom side 8 of the core material 6. However, it is not excluded that the spaces 9A at the top surface 33 would be offset with respect to the spaces 9 on the bottom side 8, for example positioned in the middle between two spaces 9 on the bottom side 8. The spaces 9A at the top surface 33 preferably have a depth D which is such that they are positioned completely above the bottom side 40 of upper groove lip 38.

It should furthermore be noted that in the example from FIGS. 8 and 9, the same or at least similar coupling means 14 are used along the short edges 4-5 as along the long sides 2-3. This is not necessarily the case.

Furthermore, the example from FIGS. 8 and 9 also has the properties of the particular independent aspect mentioned in the introduction. In addition, the spaces 9 on the edges 4-5 have a depth D which is such that at least a portion of the horizontally active surfaces 23-24 on the locking element, namely the upright portion 21A of the bottom groove lip 37 and the space 22A on the bottom side of the tongue 15, is retained at the location of the respective space 9.

Figure 10:
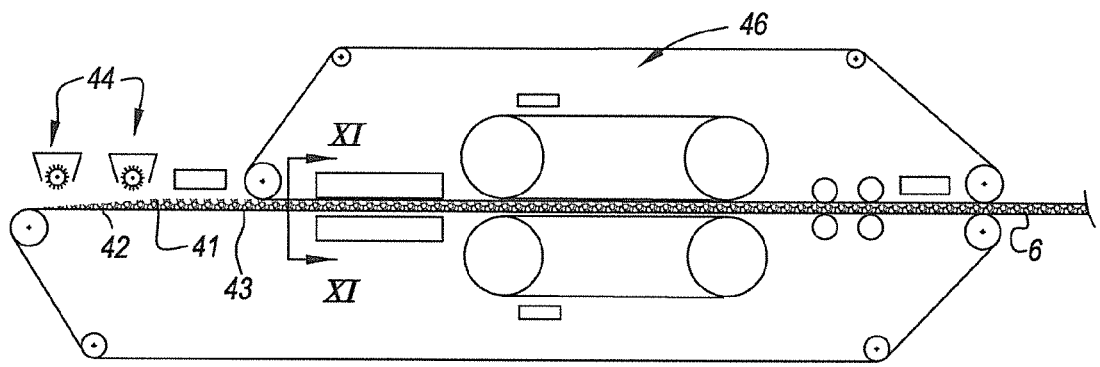
FIG. 10 diagrammatically shows a method having the features of the second aspect of the invention.

FIG. 10 diagrammatically shows some steps in a method comprising the features of the second aspect of the invention. The example from FIG. 10 is based on a material to be consolidated 41 in the form of a bed of granulates 42. In this case, the granulates 42 are scattered on a conveyor belt 43 by means of several scattering devices 44. Consolidation takes place between the belts 45 of a pressing device 46.

Figure 11:
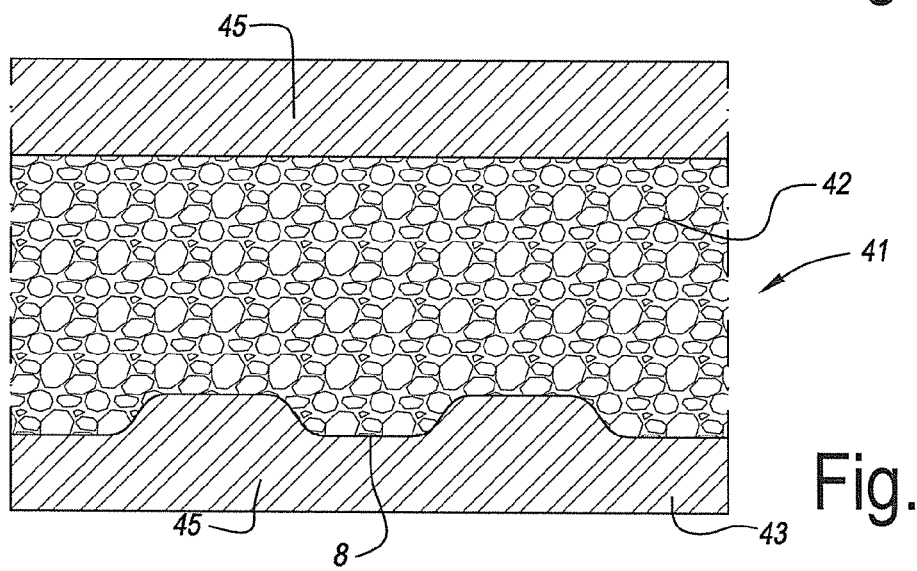
FIG. 11 shows a cross section on an enlarged scale along the intersecting line XI-XI illustrated in FIG. 10.

FIG. 11 shows that the aforementioned conveyor belt 43 is structured in accordance with the desired spaces 9 in the core material 6. Thus, the conveyor belt 43 forms a mold. After consolidation, a core material 6 is obtained which is similar to that illustrated in FIGS. 8 and 9.

Figure 12:
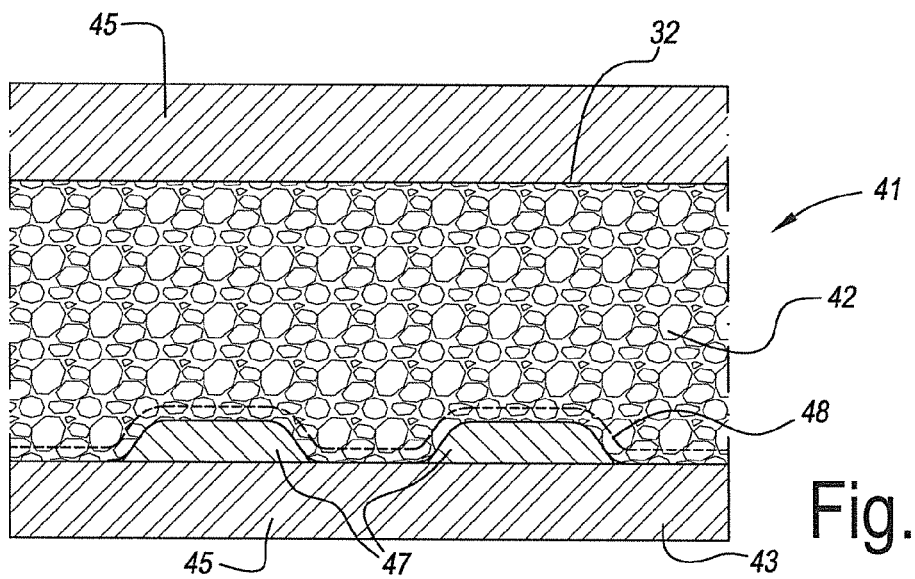
FIG. 12 shows a variant from the same view.

FIG. 12 shows an alternative in which elements 47 are provided on a generally flat or only lightly textured conveyor belt 43 which correspond to the desired spaces 9 in the core material 6. The elements 47 may be strip-shaped, as is the case here, but may also be mutually connected, for example as a result of the fact that they are situated on a common base sheet, as is indicated by means of the dashed line 48. According to an embodiment which is not shown the aforementioned elements may have been produced by means of extrusion, for example in-line extruded, by means of one or several extruding devices upstream from the aforementioned scattering devices 44. In such a case, the aforementioned elements preferably continue to form part of the final core material 6 and they have a density of 500 kg/m$^3$ or less. In other words, in this way, an embodiment may be produced which is similar to that of FIG. 6.

Figure 13:
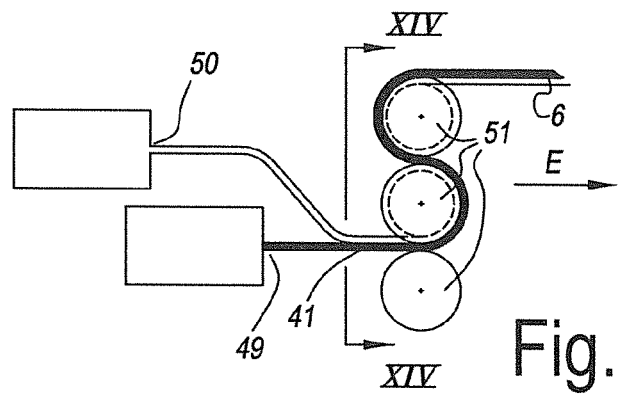
FIG. 13 diagrammatically shows another method having the features of the second aspect of the invention.

FIG. 13 shows another method comprising the features of the second aspect of the invention. The material to be consolidated 41 is in this case extruded, more particularly the extruded material is obtained by means of at least two dies 49-50, wherein the die 50 which forms the bottom side 8 of the core 6 deposits an amount of material which varies transversely to the extrusion direction E. In the illustrated example, consolidation takes place between rollers 51, but may also take place between pressing bands or calibrated stationary press plates.

Figure 14:
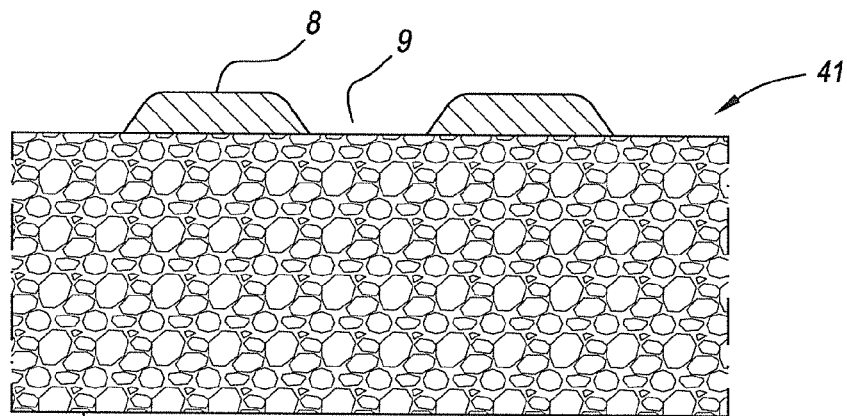
FIG. 14 shows a cross section on an enlarged scale along the intersecting line XIV-XIV illustrated in FIG. 13.

FIG. 14 shows the material to be consolidated 41. In this case, the varying amount of material has been obtained by means of a die 50 which is alternately closed and open in accordance with the desired spaces 9.

Figure 15:
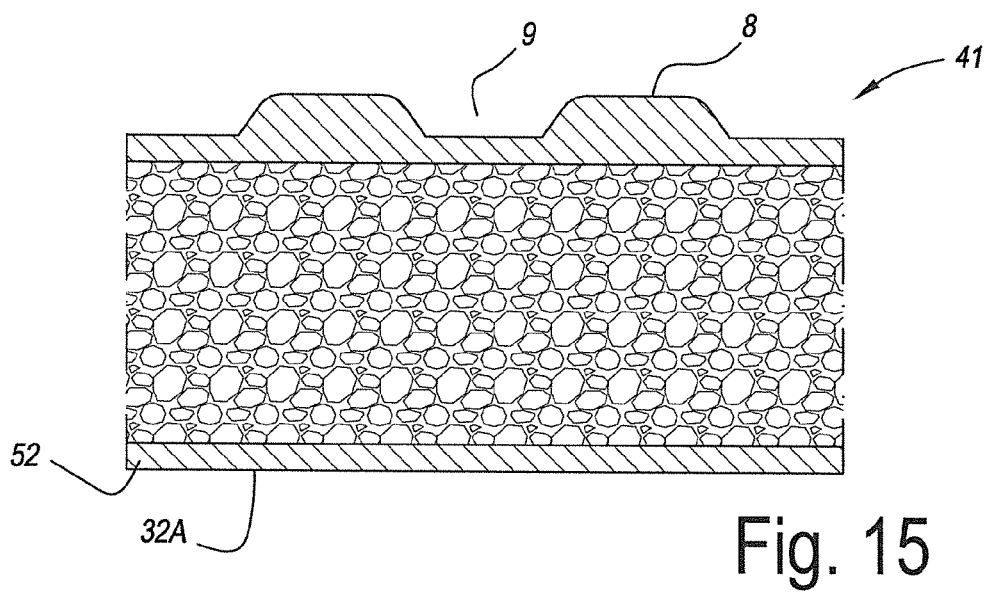
FIG. 15 shows a variant from the same view.

FIG. 15 shows an alternative, wherein the varying amount of material has been obtained by means of a T-die 50 which is configured to be comb-like on one side in accordance with the desired spaces 9. FIG. 15 furthermore shows that a material layer 52 can also be extruded at the top side 32A of the material to be consolidated 41, here at the bottom in FIG. 15, with a view to producing a balanced sandwich construction.

The present invention is by no means limited to the above-described embodiments, but such floor panels and methods for the production thereof can be achieved without departing from the scope of the present invention.

The invention claimed is:

1. A floor panel having a rectangular shape with a pair of long opposite edges and a pair of short opposite edges, the floor panel comprising a core and a decorative layer which is applied thereon,
   wherein material of the aforementioned forming the core is a plastic composite comprising thermoplastic material and at least 40 weight percent of filler, wherein the material has a density of more than 1000 kg/m$^3$;
   wherein the thermoplastic material is polyvinyl chloride, polypropylene, polyethylene or polyethylene terephthalate, and said filler has a greater specific weight than the thermoplastic material;

wherein the decorative layer comprises a printed thermoplastic film showing a pattern and a thermoplastic plastic layer situated on top of the pattern;

wherein the core forms one or more spaces on a bottom side thereof;

wherein the floor panel is provided, on the pair of long opposite edges and on the pair of short opposite edges, with mechanical coupling parts arranged for coupling two of such floor panels to each other at respective sides, an interlocking is arranged to be produced in a coupled state of two of such floor panels, at least in a direction at right angles to the respective sides and in a plane of the floor panels;

wherein the mechanical coupling parts comprise a male coupling part and a female coupling part that cooperate with each other in said coupled state;

wherein the female coupling part is provided with a lip projecting beyond an associated top edge and wherein the lip is provided with a locking element in the form of an upright portion at a top side of the lip which can cooperate with a locking element on the bottom side of the male coupling part, in the form of a space in the bottom side of the male coupling part;

wherein in the coupled state at least horizontally active locking surfaces are produced on the locking elements;

wherein the bottom of the lip comprises one or more of the spaces;

wherein the one or more of the spaces has a depth such that the one or more of the spaces remains completely below the top side of the lip.

2. The floor panel of claim 1, wherein the thermoplastic material is polyvinylchloride having a plasticizer content of 5phr or less or even without plasticizer.

3. The floor panel of claim 1, wherein the spaces result in a weight reduction of the core of at least 15%.

4. The floor panel of claim 1, wherein a cork layer or a synthetic foam layer is provided on the bottom side of the core.

5. The floor panel of claim 4, wherein said cork layer or synthetic foam layer is continuous along said bottom of said lip.

6. The floor panel of claim 1, wherein the spaces extend continuously from one side of the floor panel to another side of the floor panel.

7. The floor panel of claim 1, wherein the the spaces extend in a length direction of the floor panel.

8. A method for manufacturing floor panels, wherein each floor panel of the floor panels has a rectangular shape with a pair of long opposite edges and a pair of short opposite edges, the floor panel comprising a core and a decorative layer which is applied thereon, and the method at least comprises the step of consolidating a material of the core, wherein the material to be consolidated has internal spaces and/or wherein the material to be consolidated has one or more spaces on its bottom side;

wherein the material forming the core is a plastic composite comprising thermoplastic material and at least 40 weight percent of filler, wherein the material has a density of more than 1000 kg/m³;

wherein the thermoplastic material is polyvinyl chloride, polypropylene, polyethylene or polyethylene terephthalate, and said filler has a greater specific weight than the thermoplastic material;

wherein the decorative layer comprises a printed thermoplastic film showing a pattern and a thermoplastic plastic layer situated on top of the pattern;

wherein the floor panel is provided, on the pair of long opposite edges and on the pair of short opposite edges, with mechanical coupling parts arranged for coupling two of such floor panels to each other at respective sides, whereby an interlocking is arranged to be produced in a coupled state of two of such floor panels, at least in a direction at right angles to the respective sides and in a plane of the floor panels;

wherein the mechanical coupling parts comprise a male coupling part and a female coupling part that cooperate with each other in said coupled state;

wherein the female coupling part is provided with a lip projecting beyond an associated top edge and wherein the lip is provided with a locking element in the form of an upright portion at a top side of the lip which can cooperate with a locking element on the bottom side of the male coupling part, in the form of a space in the bottom side of the male coupling part;

wherein in the coupled state at least horizontally active locking surfaces are produced on the locking elements;

wherein the bottom of the lip comprises one or more of the spaces;

wherein the one or more of the plurality of spaces has a depth such that one or more of the spaces remains completely below the top side of the lip.

9. The method of claim 8, wherein the material to be consolidated comprises a scattered bed of granulates, powders, fibers or other particles and/or wherein the material to be consolidated comprises an extruded material and/or wherein the material to be consolidated comprises a slurry.

10. The method of claim 9, wherein the material to be consolidated comprises a scattered bed of granulates, powders, fibers or other particles and/or a slurry, wherein the material to be consolidated is arranged on a mold or wherein the material to be consolidated is arranged on a structured conveying element.

11. The method of claim 9, wherein the material to be consolidated comprises an extruded material, wherein the material to be consolidated is formed by extrusion using a T-die, wherein a slit which is situated on the side forming the bottom side of the core is comb-like.

12. The method of claim 9, wherein the material to be consolidated comprises an extruded material, wherein the material to be consolidated is formed by extrusion using at least two dies, wherein a die which forms the bottom side of the core extrudes an amount of material which varies transversely to an extrusion direction.

\* \* \* \* \*